NARROW BANDWIDTH RECEIVER WITH OUTPUT EQUAL TO THE VOLTAGE DIFFERENCE OF A SELECTED MODULATION FREQUENCY AND ALL FREQUENCY VOLTAGES

Filed April 1, 1963

INVENTOR.
ANDREW F. DEMING
BY Woodling, Krost, Granger and Rust
ATTORNEYS

United States Patent Office 3,333,272

Patented July 25, 1967

3,333,272

NARROW BANDWIDTH RECEIVER WITH OUTPUT EQUAL TO THE VOLTAGE DIFFERENCE OF A SELECTED MODULATION FREQUENCY AND ALL FREQUENCY VOLTAGES

Andrew F. Deming, Alliance, Ohio, assignor to Consolidated Electronics Industries Corporation, a corporation of Delaware Filed Apr. 1, 1963, Ser. No. 269,637
13 Claims. (Cl. 343—225)

Figures 1, 2:
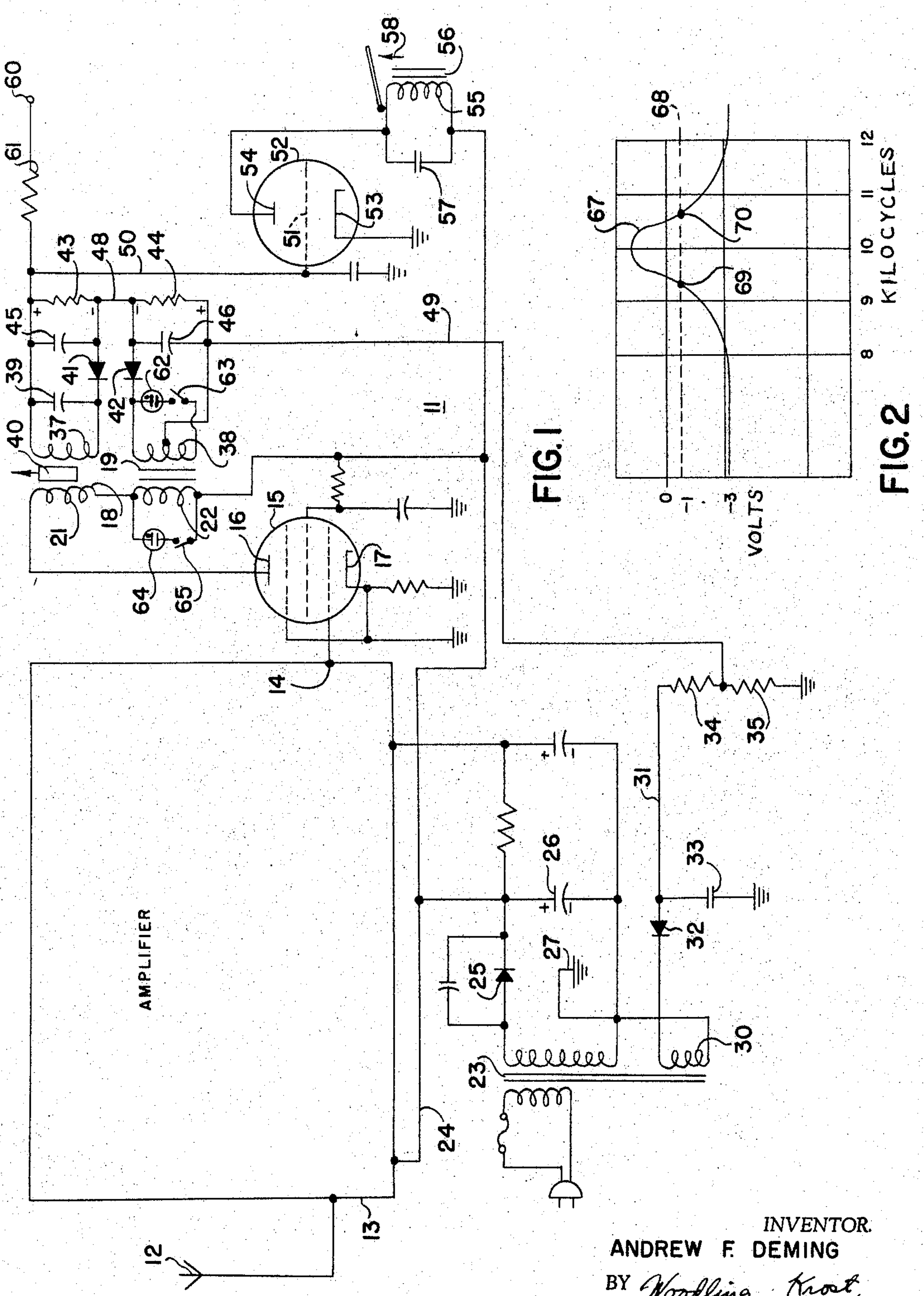

The invention relates in general to band pass amplifiers and, more particularly, to a remote control radio receiver having a narrow band selectivity characteristic.

In remote control radio systems including a transmitter and receiver where the transmitter may be operated to provide a signal to the receiver and the receiver then controls some controllable electrical device, it is difficult to obtain a high degree of selectivity consistent with economy of manufacture and reliability of the complete system. Such systems are used in several applications and one is for the remote control of electrically operated garage doors with the transmitter being operated from an automobile at ranges of 50 to 200 feet, for example. It is highly desirable to provide some coding so that unauthorized persons may not operate the receiver and gain access to the garage, hence, a system used is to provide different carrier frequencies. The government regulations concerning use of radio systems of this type limits the range and the frequencies in which the system may operate, thus limiting the number of possible codes obtainable by different carrier frequencies. A refinement is to provide different modulation or keying frequencies superimposed on the carrier frequency but this increases cost and introduces complexity into the transmitter and receiver of the system. The use of multiple modulation or intelligence frequencies superimposed on the carrier is only effective where the receiver is sufficiently selective to be able to adequately distinguish between two different modulation frequencies. A further problem is when two carrier frequencies may be separated by a small amount and the inter-modulation between these two carriers provide a difference frequency equal to a modulation frequency to which a particular receiver is tuned and this may cause false operation because the receiver will receive both the correct carrier plus the correct modulation frequency. If the receiver circuits are made more selective, then it becomes more difficult to keep the particular transmitter and receiver in a single system aligned for operation of that receiver from that transmitter. Also, this involves more expensive and additional circuit components.

Accordingly, an object of the present invention is to provide a narrow band pass or highly selective receiver at an economical price and one which is easy to tune and to keep in tune and one which has a minimum of false operation.

Another object of the present invention is to provide a remote control radio receiver with narrow band characteristics.

Another object of the invention is to provide a remote control radio receiver which is highly selective regardless of signal strength.

Another object of the invention is to provide a remote control radio receiver which will reject modulation frequencies close to but not exactly on the proper modulation frequency.

Another object of the invention is to provide a remote control radio receiver which is easy to tune and which may be tuned by non-technical personnel.

Another object of the invention is to provide a selective radio receiver circuit using a resonant circuit tuned to the desired modulation frequency in series with another bucking circuit which does not have a series resistance to increase the load on the preceding amplifier and which bucking circuit provide a bucking signal in accordance with noise or off-frequency modulation.

Another object of the invention is to provide a remote control radio system in which closely spaced modulation frequencies may be used in adjacent systems without false operation.

Another object of the invention is to provide a remote control radio system wherein many different channels may be provided in a small frequency spectrum.

Another object of the invention is to provide a remote control radio receiver utilizing a visual tuning aid easily used by non-technical personnel.

Other objects and a fuller understanding of the invention may be had by referring to the following description and claims, taken in conjunction with the accompanying drawings, in which:

FIGURE 1 is a schematic diagram of a remote control radio receiver embodying the invention; and, FIGURE 2 is a graph of operating characteristics of the invention.

FIGURE 1 shows a remote control radio receiver 11 which has an antenna 12 supplying the input to an amplifier 13. This amplifier 13 may operate in the VHF band, for example, 200 to 300 megacycles. The amplifier 13 may include a detector to detect the modulation, keying or intelligence frequency on the VHF carrier. This intelligence frequency may be within the audio frequency band, for example 10 kilocycles. This intelligence frequency may be established as modulation on the carrier or it may be established by keying or interrupting the carrier. In either event, it is an intelligence frequency component which may be detected by a low frequency detector and which will appear at an output terminal 14. An amplifier tube 15 may be used to amplify this intelligence frequency and this amplifier tube 15 has an anode 16 and a cathode 17 connected to an output circuit which includes first and second transformers 18 and 19. A first primary 21 of the first transformer 18 and a second primary 22 of the second transformer 19 are connected in series and connected to the anode 16.

A power supply transformer 23 supplies working DC voltages to a bus 24 through a rectifier 25. A filter capacitor 26 supplies the return path to ground 27 for the plate current in the amplifier tube 15.

The power supply transformer 23 also has another winding 30 providing a negative DC potential on a bus 31 through a bias rectifier 32. A filter capacitor 33 filters this negative DC voltage which appears across bias resistors 34 and 35.

The first and second transformers 18 and 19 have first and second secondaries 37 and 38, respectively. A tuning capacitor 39 is connected across the first secondary 37. The first transformer 18 has a movable core 40 which is a tuning slug and this, in conjunction with the tuning capacitor 39 tunes the first transformer 18 to resonance at the intelligence frequency, e.g., 10 kc. A first rectifier 41 is connected to the first secondary 37 and a second rectifier 42 is connected to the second secondary 38. A first load resistor 43 is connected in series with the first rectifier 41 across the first secondary 37 and a second load resistor 44 is connected in series with the second rectifier 42 across the second secondary 38. Filter capacitor 45 and 46 are connected across the load resistors 43 and 44, respectively, to smooth the DC voltage across these load resistors.

The two load resistors 43 and 44 are interconnected by a conductor 48. A conductor 49 connects the lower end of the load resistor 44 through the bias resistor 35 to ground. The upper end of load resistor 43 is connected by a conductor 50 to the grid 51 of a relay actuating tube 52.

This tube has a cathode 53 connected to ground and an anode 54 connected through the actuating coil 55 of a pilot relay 56 to the high voltage bus 24. A time delay capacitor 57 is connected across the actuating coil 55. The pilot relay 56 has normally open contacts 58. A test point 60 is connected to the conductor 50 through a limiting resistor 61.

A gaseous or neon lamp 62 is connected across the secondary 38 through a switch 63. An alternative location for the lamp 62 is indicated by a lamp 64 connected across the primary 22 through a switch 65.

*Operation*

The remote control radio receiver 11 may have the amplifier 13 tuned to a carrier of any suitable frequency and this carrier may be within the VHF band, for example 250 megacycles. The amplifier 13 has a detected low frequency output 14 applied to the amplifier 15 which amplifies this low frequency component. For example, this might be 10 kc. This amplified low frequency output is applied to the series connected primaries 21 and 22 of the two output transformers 18 and 19. The first transformer 18 is tuned via the tuning slug 40 and tuning capacitor 39 to be resonant to this intelligence component, in this example 10 kc. The second transformer 19 is nonresonant and, hence, responsive to all frequency components present in the output of the amplifier 15. The rectifiers 41 and 42 supply a DC voltage on the load resistors 43 and 44, respectively, in direct accordance with the voltage across the secondaries 37 and 38, respectively. These two voltages on resistors 43 and 44 are in opposition due to the opposed polarity connections of the rectifiers 41 and 42. The upper end of resistor 43 is positive, whereas the upper end of resistor 44 has a negative voltage thereon. These two resistors are connected in series to the input of the relay actuating tube 52. The bias resistor 35 is also connected in series in this input which is to the grid 51 of the tube relative to the cathode 53. In tracing the input circuit to this relay actuating tube 52 and starting at the grounded cathode, a negative voltage is obtained from the bias resistor 35, then another negative voltage from the load resistor 44 and then a positive voltage from the load resistor 43. The relay actuating tube 52 may be a 6EV7, for example, which is specifically designed as a relay actuating tube and has a cut-off point of about minus one volt on the grid 51. This means that with more negative values of potentials on the grid 51, the conduction through tube 52 is below a predetermined level and the relay contacts 58 of the pilot relay 56 will not be actuated. For grid potentials more positive than minus one volt, the current through amplifier 52 will be above the predetermined level and, accordingly, the relay 56 will pull in to close the contacts 58. The above is by way of example for the particular type of tube 52 and for a particular value of load impedance on this tube 52.

With no signal being received on the antenna 12, the bias supplied to the tube 52 will be essentially that supplied by the bias resistor 35 because there will be only insignificant voltages developed on load resistors 43 and 44. Such voltages will only be because of random noise in the amplifier or in the atmosphere. The bias resistor 35 may supply a sufficient voltage to cause cut-off of the tube 52 and in the above example, this may be minus four volts. Atmospheric noises which are generally at random frequency, will be amplified in the receiver 11 and will appear in the output of the tube 15. Since these are random frequencies rather than any one predetermined frequency, the voltage on the two transformer secondaries 37 and 38 will both rise together and, accordingly, the voltages on both load resistors 43 and 44 will also rise together. Since these two voltages are in opposition, they will cancel each other and will not cause the relay actuating tube 52 to conduct.

If a carrier is received on antenna 12 which is of a frequency to which the amplifier 13 is tuned, this carrier will be amplified therein. If this carrier also has a low frequency intelligence signal thereon, it will be supplied at the output 14 to the amplifer 15. If this intelligence component is of the proper frequency, namely 10 kc., it will resonate the first transformer 18 and thus develop a voltage on the load resistor 43 considerably in excess of the voltage developed on load resistor 44. This is illustrated in FIGURE 2 which shows a resonant curve 67 showing the resonance of the first transformer 18. The tuning of the secondary 37 is reflected into the primary 21 so that the entire first transformer 18 is resonant at a predetermined frequency. A straight line 68 illustrates the cut-off point for the relay actuating tube 52 and in this example is shown as minus one volt. The turns ratio of the first and second transformers 18 and 19 plus the values of the load resistors 43 and 44 are preferably chosen so that the voltage developed on load resistor 43 at the predetermined frequency is approximately 75% higher than the voltage on load resistor 44. For example, 14 volts may be developed across load resistor 43 at resonance whereas only 8 volts will be developed across load resistor 44. The total bias on the input of the relay actuating tube 52 will then be minus 4 minus 8 plus 14 or plus 2 volts, which will cause pull-in of the relay contacts 58 after the time delay caused by capacitor 57. This capacitor 57 prevents false operation by delaying actuation of the relay for about one-half second.

If a proper frequency carrier is received which has a modulation component of an incorrect frequency, this modulation frequency will still be amplified by the amplifier 15. Since it is not the frequency to which the first transformer 18 is resonant, substantially equal and opposite voltages will appear on the load resistors 43 and 44 and this will not cause pull-in of the relay 56. The resonant curve 67 is not particularly sharp but it is made effectively sharp between points 69 and 70 by having the cutoff line 68 in effect selecting only the upper portion of this resonant curve 67. It has been found that a carrier of the proper frequency carrying modulation of 9 kc. for example, is not sufficiently close to the proper modulation frequency of 10 kc. to cause pull-in of the relay 56. This is because the voltage developed on the resistor 43 is not sufficiently higher than the voltage on resistor 44 to cause pull-in of the relay 56. This effectively provides a very narrow band and selective amplifier. Accordingly, with this selective band pass, another modulation frequency in another transmitter and receiver combination may be spaced at only a 2 kc. difference, namely, at 8 kc. or 12 kc.

If another transmitter happens to be transmitting at the same time as the transmitter for this receiver system, and the two transmitters have carriers which are very closely of the same frequency but separated by an audio frequency difference, then it is possible that this difference frequency will be amplified by the amplifier 15. Because of the high selective nature of the present receiver system, the chance of false operation is greatly minimized. This is because as the voltage on resistor 43 rises, an opposing voltage on resistor 44 also rises.

This remote control radio receiver may be used in the remote control of electrically operated garage doors, for example, which have an extremely wide range of signal strength. If the transmitter is operated when the automobile is 200 feet distant, for example, the signal strength may be down to one microvolt. If the transmitter is not operated until the automobile is directly outside the door, for example as the automobile is being backed out of the garage, then the signal strength may be one thousand times as high. This wide variation in received signal strength does not adversely affect the selectivity of the receiver because the voltages on the resistors 43 and 44 are connected in opposition. This means that a correct modulation frequency will be resonated by the first transformer 18 to develop a considerably larger voltage on resistor 43 than on resistor 44 to actuate the relay contacts, with very little dependence on the actual strength. With large signal strength, the voltages on resistors 43 and 44 will naturally increase, but the difference between these two voltages does not increase nearly as much, therefore precluding heavy overloading of the relay actuating tube 52.

The neon lamp 62 or its alternative location at 64 across the primary 22 is quite useful in tuning the receiver system 11. This neon lamp has a definite breakdown voltage before being illuminated and until it is illuminated, it presents a very high impedance so that it does not load the second transformer 19. Accordingly, during reception of weak signals, an insufficient voltage is developed across the second transformer 19 to illuminate the lamp 62 and, thus, there is no extra loading on this transformer 19. Also, the circuit eliminates any load resistor directly across the secondary 38. This means that the receiver still has as great a sensitivity as it would have even though the neon lamp 62 or 64 were not provided. However, during reception of strong signals, the neon lamp 62 will be illuminated. It will be illuminated by lightning flashes for example, but these will be random impulses easily detectable since they are in synchronism with the lightning flashes. The neon lamp will be illuminated as the transmitter is brought sufficiently close to the receiver so that the voltage on the transformer 19 is greatly increased. Also, the neon lamp 62 will be illuminated upon the presence of a modulated carrier wherein the modulation is of incorrect frequency. In this case, however, the relay 56 will not be actuated. The actuation of the relay can be heard by an observer by a light click indicating that the relay has pulled in. If the neon lamp 62 is illuminated but the relay has not pulled in, this indicates two things. First, that a carrier of the wrong modulation frequency is being received and, second, that all preceding circuitry of the radio receiver is operating normally. Accordingly, an easy test of the operation of the receiver 11 is to remove the antenna from the receiver so that only a weak signal will be available at amplifier 15. Then the transmitter is operated to transmit the modulated carrier. With the transmitter close to the receiver, this weak signal should be adequate for actuating the receiver even though the receiver antenna is removed. If the neon lamp is illuminated but the relay has not pulled in, this indicates the receiver frequency is not properly aligned with the transmitter frequency. Accordingly, the tuning slug 40 may be moved to easily tune the receiver to the transmitter frequency by even non-technical personnel. The tuning slug is merely moved until the relay pulls in. The fact that the neon lamp has been illuminated during this tuning process shows that a modulated carrier wave is being received and the preceding circuitry in the receiver is functioning normally. Slight differences in manufacturing tolerances are thus readily compensated for in the field to match perfectly a receiver with its transmitter. Also, if a second transmitter-receiver system is in use in close proximity, the two systems may be tuned by non-technical personnel to slightly different modulation frequencies so as to not provide interference therebetween with consequent false operation.

Switches 63 and 65 indicate alternative locations for the neon lamp 62 or 64. A proper turns ratio is selected on either the primary or secondary for connection to the neon lamp. Usually, only one such neon lamp need be provided and in such case the respective switch may be eliminated.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A remote control radio receiver for use with a carrier wave having a predetermined lower frequency intelligence thereon, comprising in combination, an input circuit for receiving said carrier wave, an amplifier in said radio receiver having an output and amplifying said intelligence frequency component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor in accordance with said predetermined intelligence frequency, a second load resistor and second rectifier means connected in series across said second secondary means to develop a DC voltage across said second load resistor in accordance with all alternating output voltages of said amplifier, relay means having input means and an operation threshold, means connecting said first and second load resistors in the input circuit of said relay means with said first and second load resistors being connected in opposition with said first load resistor being connected to increase the input to said relay means, said first and second load resistors developing voltages in opposition upon said receiver receiving atmospheric noise or a carrier having incorrect intelligence frequency thereon so that said relay means is not actuated, and said first load resistor developing a voltage considerably in excess of the voltage across said second load resistor upon a carrier being received having intelligence of said predetermined frequency to increase the input to said relay means to a level exceeding said operation threshold to actuate said relay means to the pull-in condition.

2. A remote control radio receiver for use with a carrier wave having a predetermined lower frequency intelligence thereon, comprising in combination, an input circuit for receiving said carrier wave, an amplifier in said radio receiver having an output and amplifying said intelligence frequency component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor in accordance with said predetermined intelligence frequency, a second load resistor and second rectifier means connected in series across said second secondary means to develop a DC voltage across said second load resistor in accordance with all alternating output voltages of said amplifier, relay means having input means and an operation threshold, means connecting said first and second load resistors in the input circuit of said relay means with said first and second load resistors being connected in opposition with said first load resistor being connected to increase the input to said relay means, said first and second load resistors developing voltages in opposition upon said receiver receiving atmospheric noise or a carrier having incorrect intelligence frequency thereon so that said relay means is not actuated, said first load resistor developing a voltage considerably in excess of the voltage across said second load resistor upon a carrier being received having intelligence of said predetermined frequency to increase the input to said relay means to a level exceeding said operation threshold to actuate said relay means to the pull-in condition, a gaseous lamp connected across one of said primary means and said second secondary means, said lamp being non-illuminated during reception of weak signals to not load said second secondary means and being illuminated upon reception of strong signals to indicate the presence of strong signals of any intelligence frequency on the carrier to which the receiver is tuned, and illumination of said lamp without actuation of said relay means indicating to an observer that a carrier with an incorrect intelligence frequency is being received and also indicating that all preceding circuitry of the radio receiver is operating normally.

3. A remote control radio receiver for use with a carrier wave having a predetermined audio frequency intelligence thereon, comprising in combination, an input circuit for receiving said carrier wave, an amplifier in said radio receiver having an output and amplifying said audio frequency component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor to accordance with said predetermined audio frequency, a second load resistor and second rectifier means connected in series across said second secondary means to develop a DC voltage across said second load resistor in accordance with all alternating output voltages of said amplifier, a relay actuating tube having input and output means, a pilot relay connected in the output circuit of said relay actuating tube to be actuated upon conduction at a given level through said relay actuating tube, means connecting said first and second load resistors in the input circuit of said relay actuating tube with said first and second load resistors being connected in opposition, said second load resistor being connected in said input circuit to decrease the output of said relay actuating tube and said first load resistor being connected to increase the output of said relay actuating tube, said first and second load resistors developing voltages in opposition upon said receiver receiving atmospheric noise or a carrier having incorrect audio frequency thereon so that said relay actuating tube has an output below said given level and said pilot relay is not actuated, said first load resistor developing a voltage considerably in excess of the voltage across said second load resistor upon a carrier being received having intelligence of said predetermined frequency to increase the input to said relay actuating tube and cause conduction thereof above said given level to actuate said relay to the pull-in condition, a gaseous lamp connected across one of said primary means and said second secondary means, said lamp being non-illuminated during reception of weak signals to not load said second secondary means and being illuminated upon reception of strong signals to indicate the presence of strong signals of any intelligence frequency on the carrier to which the receiver is tuned, and illumination of said lamp without actuation of said relay indicating to an observer that a carrier with an incorrect audio frequency is being received and also indicating that all preceding circuitry of the radio receiver is operating normally.

4. A remote control radio receiver for use with a carrier wave modulated by a predetermined audio frequency comprising, in combination, an input circuit for receiving said modulated carrier wave, an amplifier in said radio receiver having an output and amplifying said modulation component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor in accordance with said predetermined modulation frequency, a second load resistor and second rectifier means connected in series across said second secondary means to develop a DC voltage across said second load resistor in accordance with all alternating output voltages of said amplifier, a relay actuating tube having input and output means, a pilot relay connected in the output circuit of said relay actuating tube to be actuated upon conduction at a given level through said relay actuating tube, means connecting said first and second load resistors in the input circuit of said relay actuating tube with said first and second load resistors being connected in opposition, said second load resistor being connected in said input circuit to decrease the output of said relay actuating tube and said first load resistor being connected to increase the output of said relay actuating tube, said first and second load resistors developing voltages in opposition upon said receiver receiving atmospheric noise or a carrier having incorrect modulation frequency thereon so that said relay actuating tube has an output below said given level and said pilot relay is not actuated, and said first load resistor developing a voltage considerably in excess of the voltage across said second load resistor upon a carrier being received having modulation of said predetermined frequency to increase the input to said relay actuating tube and cause conduction thereof above said given level to actuate said relay to the pull-in condition.

5. A remote control radio receiver for use with a carrier wave modulated by a predetermined audio frequency comprising, in combination, an input circuit for receiving said modulated carrier wave, an amplifier in said radio receiver having an output and amplifying said modulation component of said carrier wave, transformer means having primary means connected in said output of said amplifier, first and second secondary means on said transformer means, a first load resistor and first rectifier means connected in series across said first secondary means, capacitive means connected to one of said transformer means and said first secondary means to resonate same to develop a DC voltage on said first load resistor in accordance with said predetermined modulation frequency, a second load resistor and second rectifier means connected in series across said second secondary means to develop a DC voltage across said second load resistor in accordance with all alternating output voltages of said amplifier, a relay actuating tube having input and output means, a pilot relay connected in the output circuit of said relay actuating tube to be actuated upon conduction at a given level through said relay actuating tube, means connecting said first and second load resistors in the input circuit of said relay actuating tube with said first and second load resistors being connected in opposition, said second load resistor being connected in said input circuit to decrease the output of said relay actuating tube and said first load resistor being connected to increase the output of said relay actuating tube, said first and second load resistors developing voltages in opposition upon said receiver receiving atmospheric noise or a carrier having incorrect modulation frequency thereon so that said relay actuating tube has an output below said given level and said pilot relay is not actuated, said first load resistor developing a voltage considerably in excess of the voltage across said second load resistor upon a carrier being received having modulation of said predetermined frequency to increase the input to said relay actuating tube and cause conduction thereof above said given level to actuate said relay to the pull-in condition, a neon lamp connected across one of said primary means and said second secondary means, said neon lamp being non-illuminated during reception of weak signals to not load said second secondary means and being illuminated upon reception of strong signals to indicate the presence of strong signals of any modulation frequency on the carrier to which the receiver is tuned, and illumination of said neon lamp without actuation of said relay indicating to an observer that a carrier with an incorrect modulation frequency is being received and also indicating that all preceding circuitry of the radio receiver is operating normally.

6. A remote control radio receiver for use with a carrier wave modulated by a predetermined audio frequency comprising, in combination, an input circuit for receiving said modulated carrier wave, an amplifier in said radio receiver having an output and amplifying said modulation component of said carrier wave, first and second transformers having primaries connected in series and connected in said output of said amplifier, first and second secondaries on said first and second transformers, respectively, capacitive means connected to resonate said first transformer to resonance at said predetermined modulation frequency, a first load resistor and first rectifier means connected in series across said first secondary to develop a DC voltage on said first load resistor in accordance with said predetermined modulation frequency, a second load resistor and second rectifier means connected in series across said second secondary to develop a DC voltage across said second load resistor in accordance with all alternating output voltages of said amplifier, a relay actuating tube having input and output means, a pilot relay connected in the output circuit of said relay actuating tube to be actuated upon conduction through said relay actuating tube, means connecting said first and second load resistors in the input circuit of said relay actuating tube with said first and second load resistors being connected in opposition, said second load resistor being connected in said input circuit to decrease the output of said relay actuating tube and said first load resistor being connected to increase the output of said relay actuating tube, said first and second load resistors developing voltages in opposition upon said receiver receiving atmospheric noise or a carrier having incorrect modulation frequency thereon so that said relay actuating tube has minimum output and said pilot relay is not actuated, and said first load resistor developing a voltage considerably in excess of the voltage across said second load resistor upon a carrier being received having modulation of said predetermined frequency to increase the input to said relay actuating tube and cause conduction thereof to actuate said relay to the pull-in condition.

7. A remote control radio receiver for use with a carrier wave modulated by a predetermined audio frequency comprising, in combination, an input circuit for receiving said modulated carrier wave, an amplifier in said radio receiver having an output and amplifying said modulation component of said carrier wave, first and second transformers having primaries connected in series and connected in said output of said amplifier, first and second secondaries on said first and second transformers, respectively, capacitive means connected to resonate said first transformer to resonance at said predetermined modulation frequency, a first load resistor and first rectifier means connected in series across said first secondary to develop a DC voltage on said first load resistor in accordance with said predetermined modulation frequency, a second load resistor and second rectifier means connected in series across said second secondary to develop a DC voltage across said second load resistor in accordance with all alternating output voltages of said amplifier, a relay actuating tube having input and output means, a pilot relay connected in the output circuit of said relay actuating tube to be actuated upon conduction through said relay actuating tube, means connecting said first and second load resistors in the input circuit of said relay actuating tube with said first and second load resistors being connected in opposition, said second load resistor being connected in said input circuit to decrease the output of said relay actuating tube and said first load resistor being connected to increase the output of said relay actuating tube, said first and second load resistors developing voltages substantially equal and in opposition upon said receiver receiving atmospheric noise or a carrier having incorrect modulation frequency thereon so that said relay actuating tube has minimum output and said pilot relay is not actuated, said first load resistor developing a voltage considerably in excess of the voltage across said second load resistor upon a carrier being received having modulation of said predetermined frequency to increase the input to said relay actuating tube and cause conduction thereof to actuate said relay to the pull-in condition, a neon lamp connected across one of said second primary and said second secondary, said neon lamp being non-illuminated during reception of weak signals to not load said second transformer and being illuminated upon reception of strong signals to indicate the presence of strong signals of any modulation frequency on the carrier to which the receiver is tuned, and illumination of said neon lamp without actuation of said relay indicating to an observer that a carrier with an incorrect modulation frequency is being received and also indicating that all preceding circuitry of the radio receiver is operating normally.

8. A remote control radio receiver for use with a carrier wave modulated by a predetermined audio frequency comprising, in combination, an input circuit for receiving said modulated carrier wave, an amplifier in said radio receiver having an output and amplifying said modulation component of said carrier wave, first and second transformers having primaries connected in series and connected in said output of said amplifier, first and second secondaries on said first and second transformers, respectively, a movable core in said first transformer, capacitive means connected across said first secondary to resonate said first transformer to resonance in conjunction with said movable core at said predetermined modulation frequency, a first load resistor and first rectifier means connected in series across said first secondary to develop a DC voltage on said first load resistor in accordance with said predetermined modulation frequency, a second load resistor and second rectifier means connected in series across said second secondary to develop a DC voltage across said second load resistor in accordance with all alternating output voltages of said amplifier, a DC bias source, a relay actuating tube having input and output means, a pilot relay connected in the output circuit of said relay actuating tube to be actuated upon conduction through said relay actuating tube, means connecting said DC bias source in series with said first and second load resistors with said first and second load resistors being connected in opposition in the input circuit of said relay actuating tube, said second load resistor and said DC bias source being connected in the same sense in said input circuit to decrease the output of said relay actuating tube and said first load resistor being connected to increase the output of said relay actuating tube, said first and second load resistors developing voltages substantially equal and in opposition upon said receiver receiving atmospheric noise or a carrier having incorrect modulation frequency thereon so that said relay actuating tube is biased to cut off by said DC bias source and said pilot relay is not actuated, said first load resistor developing a voltage considerably in excess of the voltage across said second load resistor upon a carrier being received having modulation of said predetermined frequency to increase the input to said relay actuating tube and cause conduction thereof to actuate said relay to the pull-in condition, a neon lamp connected across said second secondary, said neon lamp being non-illuminated during reception of weak signals to not load said second transformer and being illuminated upon reception of strong signals to indicate the presence of strong signals of any modulation frequency on the carrier to which the receiver is tuned, and illumination of said neon lamp without actuation of said relay indicating to an observer that a carrier with an incorrect modulation frequency is being received and also indicating that all preceding circuitry of the radio receiver is operating normally.

9. A remote control radio receiver for use with a carrier wave modulated by modulation in the audio frequency band comprising, in combination, an input circuit for receiving and amplifying said modulated carrier wave, an ampifier tube in said radio receiver amplifying said modulation component of said carrier wave, said amplifier tube having an anode, first and second transformers having primaries connected in series and connected in said anode circuit of said amplifier tube, first and second secondaries on said first and second transformers, respectively, capacitive means connected across said first secondary to resonate said first transformer to resonance at said modulation frequency, a first load resistor and first rectifier means connected in series across said first secondary to develop a DC voltage on said first load resistor in accordance with said modulation frequency, a second load resistor and second rectifier means connected in series across said second secondary to develop a DC voltage across said second load resistor in accordance with all alternating output voltages of said amplifier tube, a neon lamp connected across said second secondary, a DC bias source, a relay actuating tube having anode, cathode and grid, means connecting said DC bias source in series with said first and second load resistors between the grid and cathode of said relay actuating tube, said first and second load resistors being connected in opposition and said first load resistor being connected with the positive terminal toward said grid and said DC bias source being connected with the negative terminal toward said grid, a pilot relay connected in the anode-cathode circuit of said relay actuating tube to be actuated upon conduction through said relay actuating tube, whereby upon receiving atmospheric noise or carriers having incorrect modulation frequency thereon a voltage is developed across both said first and second load resistors substantially equal and in opposition so that said relay actuating tube is biased to cut off by said DC bias source and said pilot relay is not actuated, and whereby when a modulated carrier is received having modulation of the correct frequency said first transformer is resonated to develop a voltage across said first load resistor considerably in excess of voltage across said second load resistor to bias positive the grid of said relay actuating tube and cause conduction thereof to actuate said relay to the pull-in condition, said neon lamp being non-illuminated during reception of weak signals to not load said second transformer and being illuminated upon reception of strong signals to indicate the presence of strong signals of any modulation frequency on the carrier to which the receiver is tuned, and illumination of said neon lamp without actuation of said relay indicating to an observer that a carrier of the wrong modulation frequency is being received and also indicating that all preceding circuitry of the radio receiver is operating normally.

10. A band pass amplifier system for use with a carrier wave modulated by a predetermined signal frequency comprising, in combination, terminal means for connection to a source of modulated carrier waves, a first load resistor and first rectifier means connected in series across said terminal means, resonant means connected to develop a DC voltage on said first load resistor in accordance with said predetermined modulation frequency, a second load resistor and second rectifier means connected in series across said terminal means to develop a DC voltage across said second load resistor in accordance with all alternating output voltages of the source, means connecting said first and second load resistors in series opposition, said first and second load resistors developing voltages in opposition upon said terminal means receiving spurious signals or a carrier having incorrect modulation frequency thereon so that the voltage across said two load resistors is less than a threshold level, said first load resistor developing a voltage considerably in excess of the voltage across said second load resistor upon a carrier being received having modulation of said predetermined frequency to increase the voltage across said two load resistors to be greater than said threshold level, a gaseous lamp connected in circuit with said second load resistor, said lamp being non-illuminated during reception of weak signals to not load said second load resistor and being illuminated upon reception of strong signals to indicate the presence of strong signals of any modulation frequency on the carrier, and illumination of said lamp without the load resistor output voltage exceeding said threshold level indicating to an observer that a carrier with an incorrect modulation frequency is present on said second load resistor.

11. A band pass amplifier system for use with a carrier wave modulated by a predetermined signal frequency comprising, in combination, an amplifier having an output and amplifying said modulation component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor in accordance with said predetermined modulation frequency, a second load resistor and second rectifier means connected in series across said second secondary means to develop a DC voltage across said second load resistor in accordance with all alternating output voltages of said amplifier, means connecting said first and second load resistors in series opposition, said first and second load resistors developing voltages in opposition upon said amplifier receiving spurious signals or a carrier having incorrect modulation frequency thereon so that the voltage across said two load resistors is less than a threshold level, said first load resistor developing a voltage considerably in excess of the voltage across said second load resistor upon a carrier being received having modulation of said predetermined frequency to increase the voltage across said two load resistors to be greater than said threshold level, a neon lamp connected across one of said primary means and said second secondary means, said neon lamp being non-illuminated during reception of weak signals to not load said second secondary means and being illuminated upon reception of strong signals to indicate the presence of strong signals of any modulation frequency on the carrier through said amplifier, and illumination of said neon lamp without the load resistor output voltage exceeding said threshold level indicating to an observer that a carrier with an incorrect modulation frequency is being passed by said amplifier and also indicating that all preceding circuitry of the amplifier system is operating normally.

12. A band pass amplifier system for use with a carrier wave modulated by a predetermined signal frequency comprising, in combination, an amplifier having an output and amplifying said modulation component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor in accordance with said predetermined modulation frequency, a second load resistor and second rectifier means connected in series across said second secondary means to develop a DC voltage across said second load resistor in accordance with all alternating output voltages of said amplifier, a relay actuating device having input and output means, a relay connected in the output means of said relay actuating device to be actuated upon conduction at a given level from the output means of said relay actuating device, means connecting said first and second load resistors in the input means of said relay actuating device with said first and second load resistors being connected in opposition, said second load resistor being connected in said input means to decrease the output of said relay actuating device and said first load resistor being connected to increase the output of said relay actuating device, said first and second load resistors developing voltages in opposition upon said amplifier receiving atmospheric noise or a carrier having incorrect modulation frequency thereon so that said relay actuating device has an output below said given level and said relay is not actuated, said first load resistor developing a voltage considerably in excess of the voltage across said second load resistor upon a carrier being received having modulation of said predetermined frequency to increase the input to said relay actuating device and cause conduction from the output means thereof above said given level to actuate said relay to the pull-in condition, a neon lamp connected across one of said primary means and said second secondary means, said neon lamp being non-illuminated during reception of weak signals to not load said second secondary means and being illuminated upon reception of strong signals to indicate the presence of strong signals of any modulation frequency on the carrier through said amplifier, and illumination of said neon lamp without actuation of said relay indicating to an observer that a carrier with an incorrect modulation frequency is being passed by said amplifier and also indicating that all preceding circuitry of the amplifier system is operating normally.

13. A remote control radio receiver for use with a carrier wave modulated by a predetermined audio frequency comprising, in combination, an input circuit for receiving said modulated carrier wave, an amplifier in said radio receiver having an output and amplifying said modulation component of said carrier wave, transformer means having primary means connected in said output of said amplifier, first and second secondary means on said transformer means, a first load resistor and first rectifier means connected in series across said first secondary means, said primary means and said first secondary means comprising winding means, capacitive means connected to said winding means to resonate same to develop a DC voltage on said first load resistor in accordance with said predetermined modulation frequency, a second load resistor and second rectifier means connected in series across said second secondary means to develop a DC voltage across said second load resistor in accordance with all alternating output voltages of said amplifier, a relay actuating device having input and output means, a pilot relay connected in the output means of said relay actuating device to be actuated upon conduction at a given level through said relay actuating device, means connecting said first and second load resistors in the input means of said relay actuating device with said first and second load resistors being connected in opposition, said second load resistor being connected in said input circuit to decrease the output of said relay actuating device and said first load resistor being connected to increase the output of said relay actuating device, said first and second load resistors developing voltages in opposition upon said receiver receiving atmospheric noise or a carrier having incorrect modulation frequency thereon so that said relay actuating device has an output below said given level and said pilot relay is not actuated, said first load resistor developing a voltage considerably in excess of the voltage across said second load resistor upon a carrier being received having modulation of said predetermined frequency to increase the input to said relay actuating device and cause conduction from the output means thereof above said given level to actuate said relay to the pull-in condition, a neon lamp connected across one of said primary means and said second secondary means, said neon lamp being non-illuminated during reception of weak signals to not load said second secondary means and being illuminated upon reception of strong signals to indicate the presence of strong signals of any modulation frequency on the carrier to which the receiver is tuned, and illumination of said neon lamp without actuation of said relay indicating to an observer that a carrier with an incorrect modulation frequency is being received and also indicating that all preceding circuitry of the radio receiver is operating normally.

References Cited

UNITED STATES PATENTS

| | | | |
|---|---|---|---|
| 2,834,879 | 5/1958 | Bauman | 317—147 |
| 2,886,703 | 5/1959 | Undy | 317—147 |
| 3,041,507 | 6/1962 | Rose et al. | 343—228 |
| 3,050,661 | 8/1962 | Jenkins | 343—225 |
| 3,168,738 | 2/1965 | Curll | 317—138 |
| 3,183,414 | 5/1965 | Goetz | 340—171 |
| 3,208,045 | 9/1965 | Nestlerode | 340—171 |

NEIL C. READ, *Primary Examiner.*

A. J. KASPER, *Assistant Examiner.*